US010527511B2

(12) United States Patent
Duqi et al.

(10) Patent No.: US 10,527,511 B2
(45) Date of Patent: Jan. 7, 2020

(54) MICROELECTROMECHANICAL TRANSDUCER WITH THIN-MEMBRANE FOR HIGH PRESSURES, METHOD OF MANUFACTURING THE SAME AND SYSTEM INCLUDING THE MICROELECTROMECHANICAL TRANSDUCER

(71) Applicant: STMICROELECTRONICS S.r.l., Agrate Brianza (IT)

(72) Inventors: Enri Duqi, Milan (IT); Lorenzo Baldo, Bareggio (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 0 days.

(21) Appl. No.: 16/101,987

(22) Filed: Aug. 13, 2018

(65) Prior Publication Data
US 2019/0064020 A1     Feb. 28, 2019

(30) Foreign Application Priority Data

Aug. 28, 2017  (IT) .......................... 102017000096658

(51) Int. Cl.
*G01L 9/00*      (2006.01)
*G01L 13/02*    (2006.01)

(52) U.S. Cl.
CPC .......... *G01L 9/0045* (2013.01); *G01L 9/0054* (2013.01); *G01L 13/025* (2013.01)

(58) Field of Classification Search
CPC ... G01L 9/0045; G01L 9/0054; G01L 13/025; G01L 9/0052
See application file for complete search history.

(56) References Cited

U.S. PATENT DOCUMENTS

| 5,485,753 | A | 1/1996 | Burns et al. | |
| 7,849,749 | B2* | 12/2010 | Yamamoto | G01L 9/0054 |
| | | | | 73/727 |
| 2007/0048889 | A1* | 3/2007 | Lin | G01L 9/0042 |
| | | | | 438/53 |
| 2010/0083765 | A1 | 4/2010 | Yoneda et al. | |
| 2010/0083766 | A1 | 4/2010 | Yoneda et al. | |

(Continued)

FOREIGN PATENT DOCUMENTS

WO         9312410 A1    6/1993

OTHER PUBLICATIONS

Sato et al., "A New Substrate Engineering for the Formation of Empty Space in Silicon (ESS) Induced by Silicon Surface Migration," *International Electron Devices Meeting*, Dec. 5-8, 1999, pp. 517-520.

*Primary Examiner* — Victor A Mandala
(74) *Attorney, Agent, or Firm* — Seed Intellectual Property Law Group LLP

(57) ABSTRACT

Microelectromechanical transducer comprising a semiconductor body, four cavities buried within the semiconductor body and four membranes, each membrane being suspended over a respective cavity and being capable of being deflected by the action of a pressure external to the microelectromechanical transducer; the microelectromechanical transducer further comprising four transducer elements housed by a respective membrane and electrically coupled to one another in a Wheatstone bridge configuration to convert said external pressure into an electrical signal.

20 Claims, 9 Drawing Sheets

(56) References Cited

U.S. PATENT DOCUMENTS

| | | | |
|---|---|---|---|
| 2013/0215931 A1* | 8/2013 | Vaiana | G01L 9/0054 374/178 |
| 2015/0122039 A1* | 5/2015 | Brown | G01L 9/0045 73/721 |
| 2016/0349129 A1* | 12/2016 | Pagani | G01L 9/0052 |
| 2016/0370242 A1* | 12/2016 | Duqi | G01L 9/0054 |
| 2017/0016790 A1* | 1/2017 | Van Der Wiel | G01L 9/0048 |
| 2018/0310411 A1* | 10/2018 | Kasper | H05K 1/185 |

* cited by examiner

MICROELECTROMECHANICAL TRANSDUCER WITH THIN-MEMBRANE FOR HIGH PRESSURES, METHOD OF MANUFACTURING THE SAME AND SYSTEM INCLUDING THE MICROELECTROMECHANICAL TRANSDUCER

BACKGROUND

Technical Field

The present disclosure relates to a microelectromechanical transducer, a method of manufacturing the microelectromechanical transducer and a system including the microelectromechanical transducer.

Description of the Related Art

As is known, integrated pressure sensors can be produced by microfabrication techniques. These sensors typically comprise a thin membrane, or diaphragm, suspended above a cavity formed in a semiconductor body. Interconnected piezoresistive elements are formed within the membrane and are connected in a Wheatstone bridge. When subjected to a pressure, the membrane undergoes deformation, causing a variation in the resistance of the piezoresistive elements, causing the Wheatstone bridge to become unbalanced. Alternatively, capacitive sensors are available, in which the membrane forms a first plate of a capacitor, while a second plate is formed by a fixed reference. In use, the deflection of the membrane generates a variation in the capacitance of the capacitor, which can be detected and associated with the pressure exerted on the membrane.

However, known types of integrated semiconductor pressure sensors are typically designed and used to measure relatively low temperatures (up to 0.1 MPa, for example). In order to increase the end-of-scale values of an integrated semiconductor pressure sensor, the rigidity of the membrane can be increased so that a signal of lower value is read for the same applied pressure, thus reducing the sensitivity of the sensor and enabling readable signals to be obtained even for higher pressure values.

For example, the rigidity of the membrane can be increased by increasing the thickness of the membrane. In processes for manufacturing semiconductor pressure sensors of a known type, the membrane is formed by epitaxial growth. The increase in the epitaxial growth time to obtain a thicker membrane has a number of drawbacks, including, for example, increased costs and increased non-uniformity of the reverse side of the semiconductor wafer, causing difficulties in the manipulation of the wafer and problems of incompatibility with subsequent steps of the manufacturing process.

BRIEF SUMMARY

Embodiments are directed to a microelectromechanical transducer, a method of manufacturing the microelectromechanical transducer and a system including the microelectromechanical transducer. One embodiment is directed to a microelectromechanical transducer configured to detect high pressures, such as pressures equal to or greater than 30 MPa.

BRIEF DESCRIPTION OF THE SEVERAL VIEWS OF THE DRAWINGS

To enable the present disclosure to be understood more readily, preferred embodiments thereof will now be described, purely by way of non-limiting example, with reference to the attached drawings, in which.

DETAILED DESCRIPTION

Figure 1:
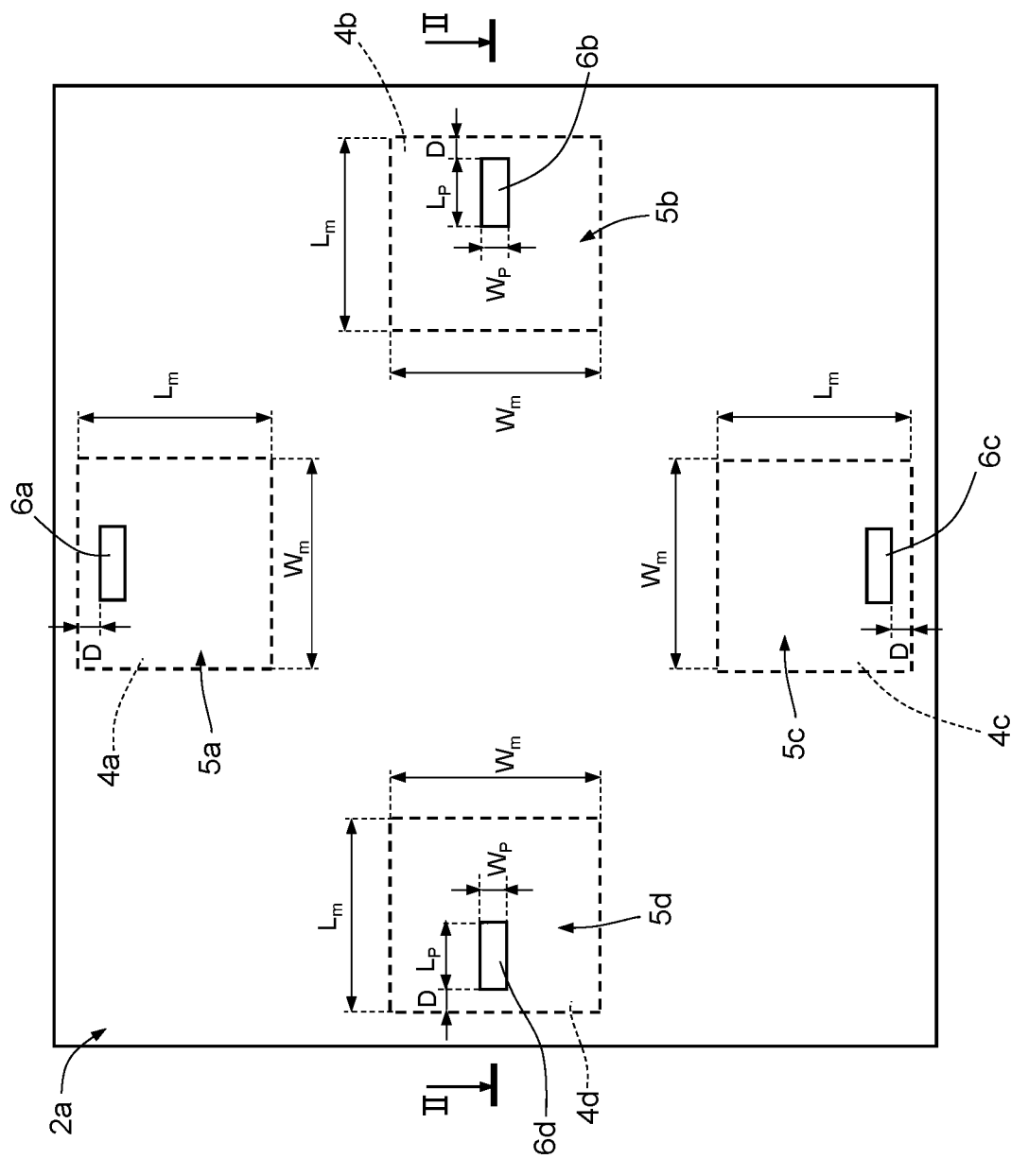
FIG. 1 shows schematically, in a top view, a microelectromechanical transducer provided with piezoresistive transducers, according to an embodiment of the present disclosure.
Figure 2:
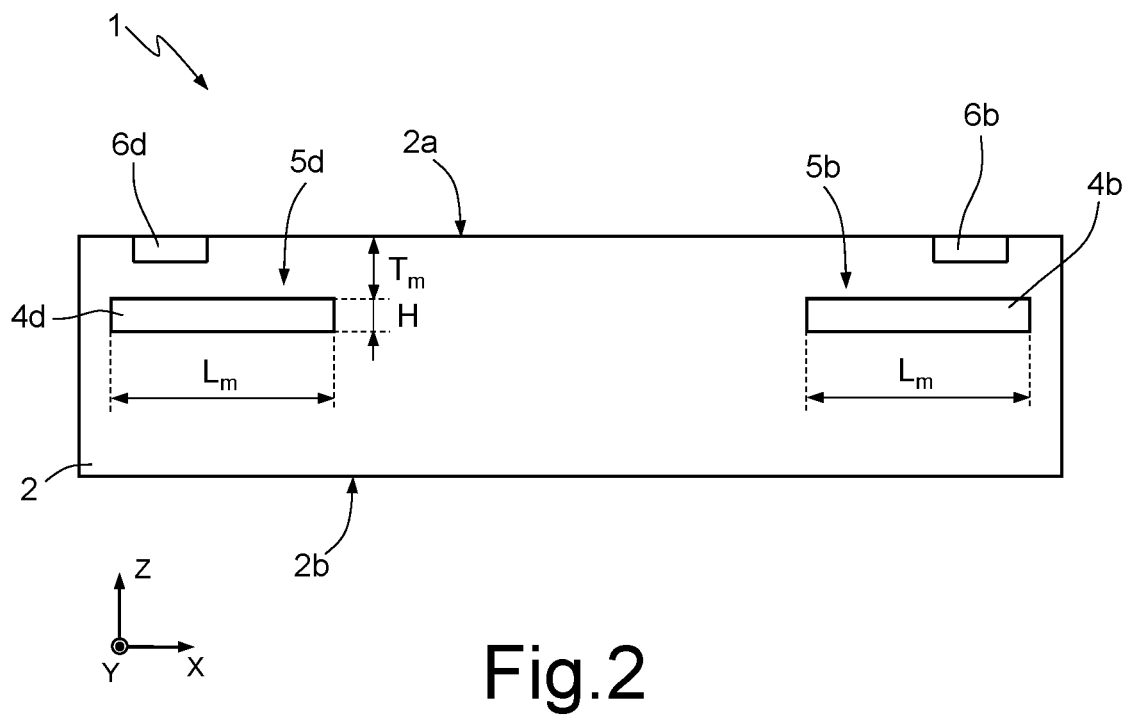
FIG. 2 shows schematically a cross section of the microelectromechanical transducer of FIG. 1, this section being taken along a section line II-II of FIG. 1.

FIG. 1 is a top view of a microelectromechanical transducer, particularly a pressure sensor 1, according to an embodiment of the present disclosure. The pressure sensor 1 of FIG. 1 is shown in a system of Cartesian axes X, Y and Z which are orthogonal to one another. FIG. 2 shows a cross section of the pressure sensor 1 along the section line II-II of FIG. 1.

With reference to FIGS. 1 and 2 considered together, the pressure sensor 1 comprises a semiconductor body 2, made of silicon for example, delimited by a front surface 2a (face side) and a rear surface 2b (reverse side), opposed to one another along the Z axis.

A first cavity 4a, a second cavity 4b, a third cavity 4c and a fourth cavity 4d extend within the semiconductor body 2. Each cavity 4a-4d is separated from the front surface 2a by a respective thin portion of the semiconductor body 2, forming, respectively, a first, second, third and fourth membrane 5a-5d suspended over the cavity 4a-4d. Each cavity 4a-4d takes the form of a parallelepiped. In particular, the first and the third membrane 5a, 5c are aligned along a direction parallel to the X axis and have a length $L_m$ (measured along a main direction of extension parallel to the X axis) of between 50 μm and 150 μm for example, equal to 70 μm for example, and a width $W_m$ (measured along a direction parallel to the Y axis) of between 50 μm and 150 μm, equal to 90 μm for example; additionally, the second and the fourth membrane 5b, 5d are aligned along a direction parallel to the Y axis and have a length $L_m$ (measured along a main direction of extension parallel to the Y axis) of between 30 μm and 80 μm for example, equal to 45 μm for example, and a width $W_m$ (measured along a direction parallel to the X axis) of between 20 μm and 70 μm for example, equal to 35 μm for example. In other words, according to one embodiment, the cavities 4a-4d (and consequently the membranes 5a-5d) are arranged at the vertices of a cross when viewed from above. According to a different embodiment, the dimensions of the second and fourth membrane 5b, 5d are equal to the dimensions of the first and third membrane 5a, 5c. The area of the first, second, third and fourth membrane is therefore generally between $2.5 \cdot 10^3$ μm² and $22.5 \cdot 10^3$ μm².

The membranes 5a-5d have a thickness $T_m$, measured along a direction parallel to the Z axis between the front surface 2a of the semiconductor body 2 and the respective cavity 4a-4d, of between 4 μm and 10 μm for example, equal to 7 μm for example.

According to one aspect of the present disclosure, the length $L_M$, the width $W_m$ and the thickness $T_m$ of the membranes 5a-5d are selected so as to provide a sensitivity of the bridge of between 5 mV/V/FS and 20 mV/V/FS, for example 15 mV/V/FS, where "FS" represents the end-of-scale value of the pressure sensor 1 (in particular, FS is between 5 MPa and 50 MPa, equal to 30 MPa for example).

According to a further aspect of the present disclosure, the length $L_M$, the width $W_m$ and the thickness $T_m$ of the membranes 5a-5d are selected so as to provide a rigidity $k_m$ of the membrane 5a-5d of between 100 N/m and $2 \cdot 10^6$ N/m, for example. According to an example of embodiment, the first and third membrane 5a, 5c have a rigidity $k_m$ of about $400^{\cdot 3}$ N/m, and the second and fourth membrane 5b, 5d have a rigidity $k_m$ of about $1.7 \cdot 10^6$ N/m. With these values of rigidity $k_m$ it is possible to obtain an end-of-scale value of the pressure sensor 1 within the aforementioned ranges.

The cavities have a thickness H, measured along a direction parallel to the Z axis, of between 1 μm and 10 μm for example, equal to 3 μm for example.

Each membrane 5a-5d houses a respective transducer element 6a-6d, particularly a transducer integrated into the semiconductor body, and even more particularly a transducer integrated on the front surface 2a of the semiconductor body 2. In one embodiment, each transducer element 6a-6d is a piezoresistor 6a-6d. In particular, the first membrane 5a houses a first piezoresistor 6a, the second membrane 5b houses a second piezoresistor 6b, the third membrane 5c houses a third piezoresistor 6c and the fourth membrane 5d houses a fourth piezoresistor 6d.

Additionally, each piezoresistor 6a-6d is placed in a peripheral region of the respective membrane 5a-5d in such a way that, during the use of the pressure sensor 1 and in the presence of an external pressure acting on the pressure sensor 1, the resultant plane stress on the piezoresistor 6a-6d is maximized. In particular, the first and the third piezoresistor 6a, 6c have a main direction of extension orthogonal to the direction of the dominant component of the stress induced on the first and third membrane 5a, 5c by the external pressure; that is to say, the second and fourth piezoresistor 6a, 6c have a main direction of extension parallel to the Y axis. Additionally, the second and the fourth piezoresistor 6b, 6d have a main direction of extension parallel to the direction of the dominant component of the stress induced on the second and fourth membrane 5b, 5d by the external pressure; that is to say, the second and fourth piezoresistor 6b, 6d have a main direction of extension parallel to the Y axis. In other words, the first and third piezoresistor 6a, 6c have a main direction of extension parallel, respectively, to the edge of the first and third membrane 5a, 5c towards which the first and third piezoresistor 6a, 6c face; additionally, the second and fourth piezoresistor 6b, 6d have a main direction of extension orthogonal, respectively, to the second and fourth membrane 5b, 5d towards which the second and fourth piezoresistor 6b, 6d face. In an example of embodiment, the minimum distance D between each piezoresistor 6a-6d and the respective edge of the membrane 5a-5d towards which each piezoresistor 6a-6d faces is between 4 μm and 20 μm, equal to 8 μm for example. In general, each piezoresistor 6a-6d may be at a different minimum distance from the respective edge of the membrane 5a-5d towards which it faces.

The piezoresistors 6a-6d have a length $L_p$ (measured along their main direction of extension) of between 5 μm and 50 μm for example, equal to 25 μm for example, and a width $W_p$ (measured along a direction orthogonal to their main direction of extension) of between 5 μm and 30 μm for example, equal to 9 μm for example.

According to one aspect of the present disclosure, the semiconductor body 2 is made of n-type monocrystalline silicon and the piezoresistors 6a-6d are p+ implanted regions.

Figure 3:
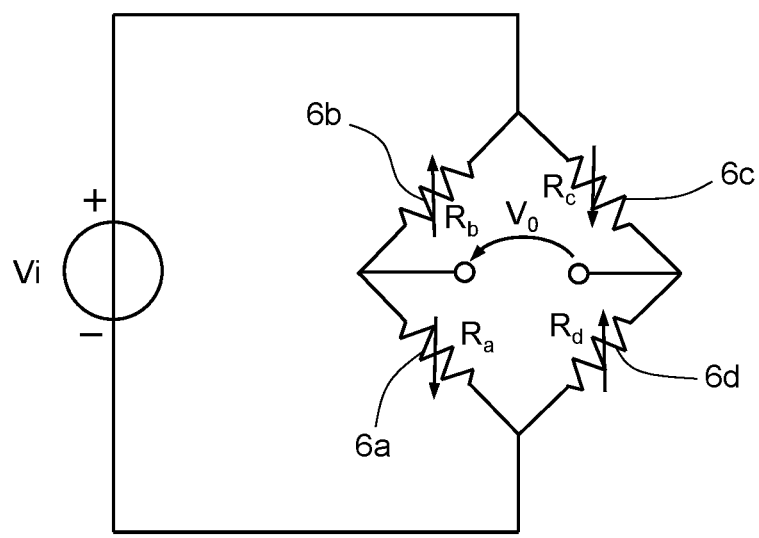
FIG. 3 is a circuit diagram of a Wheatstone bridge, used as a reading circuit of the microelectromechanical transducer of FIG. 1.

The piezoresistors 6a-6d are electrically coupled, by electrical connections which are not shown, in a Wheatstone bridge configuration, as shown schematically in the circuit of FIG. 3. During the use of the pressure sensor 1 and in the presence of the external pressure, the resistances $R_a$, $R_c$ of the first and third piezoresistor 6a, 6c respectively decrease, while the resistances $R_b$, $R_d$ of the second and fourth piezoresistor 6b, 6d respectively increase.

This change in the resistances is manifested in a change in an output voltage $V_o$ of the Wheatstone bridge biased by an input voltage $V_i$, according to the known equation $$\frac{V_o}{V_i} = \frac{2\Delta R_{a,c} - 2\Delta R_{b,d}}{4R + 2(2\Delta R_{a,c} + 2\Delta R_{b,d})} = \frac{\Delta R_{a,c} - \Delta R_{b,d}}{2R + 2(\Delta R_{a,c} + \Delta R_{b,d})} \quad (1)$$

When the following condition is present:

$$\Delta R_a = \Delta R_c = -\Delta R_b = -\Delta R_d = \Delta R$$

$$R_a = R_b = R_c = R_d = R \quad (2)$$

Equation (2) is simplified to:

$$\frac{V_o}{V_i} = \Delta R/R \quad (3)$$

In conclusion, the output voltage $V_O$ is correlated with the external pressure.

Figure 4:
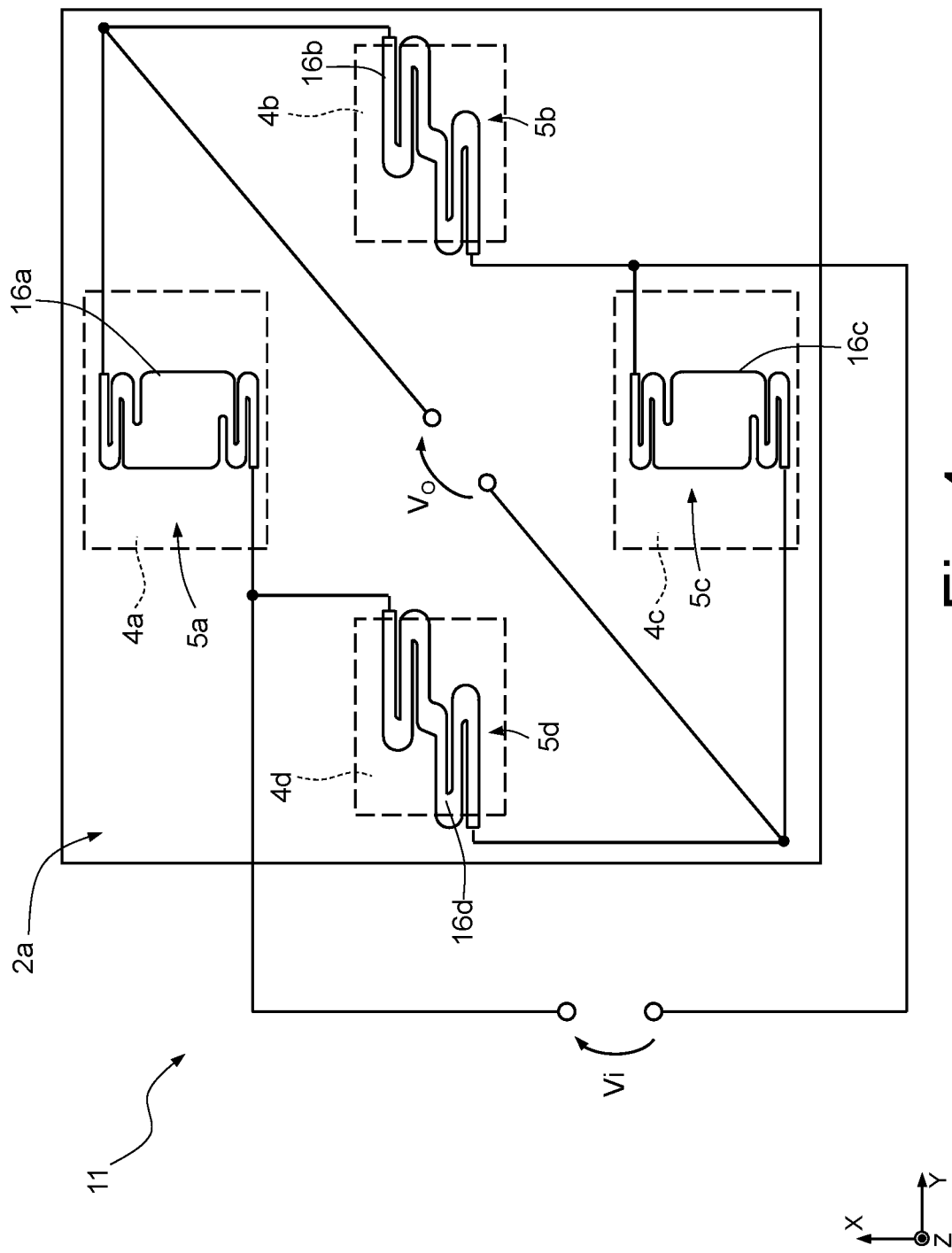
FIG. 4 shows schematically, in a top view, a microelectromechanical transducer provided with piezoresistive transducers, according to a further embodiment of the present disclosure.

FIG. 4 shows, in a top view, a microelectromechanical transducer 11 according to a further embodiment of the present disclosure. The pressure sensor 11 differs from the pressure sensor 1 in the shape of the piezoresistors housed by each membrane 5a-5d, and is described solely with respect to the differences from the pressure sensor 1. Elements in common with the pressure sensor 1 are indicated by the same reference numbers, and are not detailed further.

The pressure sensor 11 comprises, as in the pressure sensor 1, four membranes 5a-5d which house respective transducer elements of the piezoresistive type 16a-16d, electrically coupled to one another to form a Wheatstone bridge circuit. A first piezoresistor 16a, in the form of a double zigzag, is housed by the first membrane 5a; a second piezoresistor 16b, in the form of a double zigzag, is housed by the second membrane 5b; a third piezoresistor 16c, in the form of a double zigzag, is housed by the third membrane 5c; and a fourth piezoresistor 16d, in the form of a double zigzag, is housed by the fourth membrane 5d.

Figure 5:
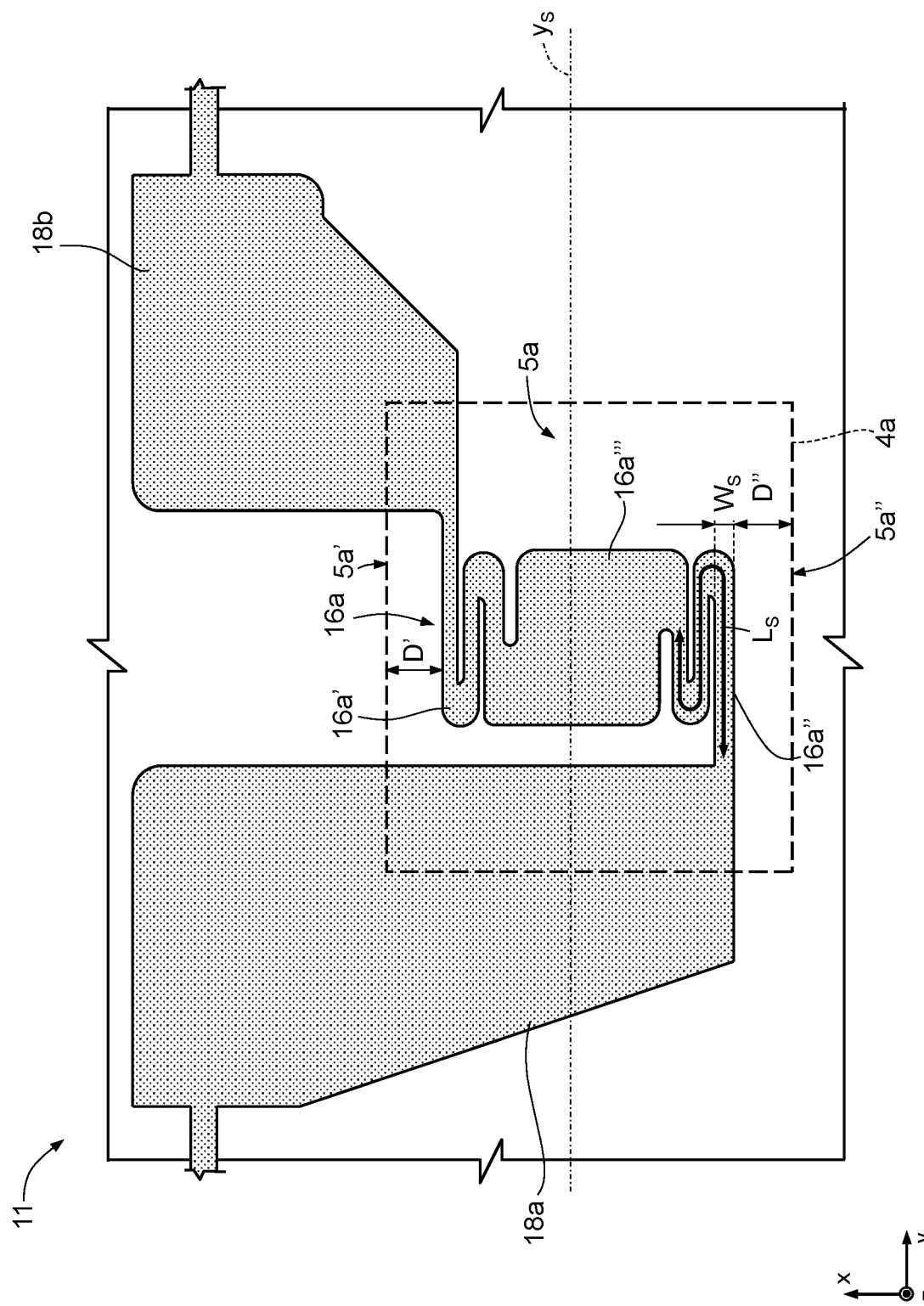
FIGS. 5 and 6 show schematically, in a partial top view, enlarged details of the microelectromechanical transducer of FIG. 4.

FIG. 5 shows, in a top view, a portion of the microelectromechanical transducer 11, from which the shape of the first piezoresistor 16a, housed by the first membrane 5a, can be appreciated. FIG. 5 also shows a first and a second electrical connection 18a, 18b that can be used to read the signal transduced by the first piezoresistor 16a. The electrical connections 18a, 18b are, for example, p+ implanted regions formed at the same time as the formation of the first piezoresistor 16a.

The first piezoresistor 16a is formed by a first portion 16a', a second portion 16a" and a third portion 16a'". The first portion 16a' and the second portion 16a" of the first piezoresistor 16a face towards a respective first edge 5a' and second edge 5a" of the first membrane 5a, these first and second edges 5a', 5a" being parallel to the Y axis. In particular, the first portion 16a' of the first piezoresistor 16a extends to a first distance D' (of between 5 µm and 50 µm for example, equal to 15 µm for example) from the first edge 5a' of the first membrane 5a, while the second portion 16a" of the first piezoresistor 16a extends to a second distance D" (of between 5 µm and 50 µm for example, equal to 15 µm for example) from the second edge 5a" of the first membrane 5a. According to one aspect of the present disclosure, the first and second distance D', D" are measured along the same axis (the X axis in this case) and are substantially equal to one another. The first and second portion 16a', 16a" of the first piezoresistor 16a therefore extend symmetrically with respect to an axis of symmetry $y_s$ which is parallel to the first and second edge 5a', 5a" of the first membrane 5a and passes through the geometric center of the first membrane 5a.

Additionally, the first and second portion 16a', 16a" of the first piezoresistor 16a are connected, respectively, to the first and second electrical connection 18a, 18b and have a zigzag shape when viewed from above, having a plurality (three in this case) of straight segments connected by curved portions. In particular, each straight segment has a main direction of extension parallel, respectively, to the first and second edge 5a', 5a" of the first membrane 5a; the third portion 16a'" of the first piezoresistor 16a has a substantially square shape when viewed from above, and extends in a central portion of the first membrane 5a, interconnecting the first and the second portion 16a', 16a" of the first piezoresistor 16a.

The zigzags forming the first and second portion 16a', 16a" of the first piezoresistor 16a each have a total length $L_s$ of between 40 µm and 80 µm for example, equal to 60 µm for example, and a width $W_s$ of between 1 µm and 3 µm, equal to 2 µm for example. The total length $L_s$ and the width $W_s$ of the first and second portion 16a', 16a" of the first piezoresistor 16a are selected so as to provide a suitable value of resistance for the desired value of sensitivity of the pressure sensor 11; for example, the resistance of each of the first and second portion 16a', 16a" of the first piezoresistor 16a is between 1 kilohm and 10 kilohm for a sensitivity value of between 5 mV/V/FS and 20 mV/V/FS. The zigzag shape enables the compactness of the first piezoresistor 16a to be increased, allowing the same resistance to be obtained in a smaller area compared with a square shape.

The first and second electrical connection 18a, 18b extend partially above the first membrane 5a to make the pressure sensor 11 more compact.

The contribution to the transduced signal generated by a piezoresistive effect by portions of the first and second electrical connections 18a, 18b which extend over the first membrane 5a is negligible, because of their low resistance relative to the resistance of the first and second portion 16a', 16a" of the first piezoresistor 16a.

The third portion 16a'" of the first piezoresistor 16a also makes a negligible contribution to the transduced signal, because of its low resistance and because of the fact that it extends in a central region of the first membrane 5a, in which the plane stress due to an external pressure acting on the pressure sensor 11 is minimized.

The main contribution to the transduced signal is therefore provided by the first and second portion 16a', 16a" of the first piezoresistor 16a. According to the embodiment of FIGS. 4 and 5, the first piezoresistor 16a is scarcely subject to any variations of sensitivity due to errors of alignment between the first piezoresistor 16a and the first membrane 5a. For example, if there is an error of alignment at the end of the manufacturing process such that the distance D' is smaller than the distance D", the first portion 16a' of the first piezoresistor 16a is subject to greater stress than in a condition of perfect alignment, while the second portion 16a" of the first piezoresistor 16a is subject to a smaller stress, so that the total contribution to the transduced signal is substantially unchanged.

Figure 6:
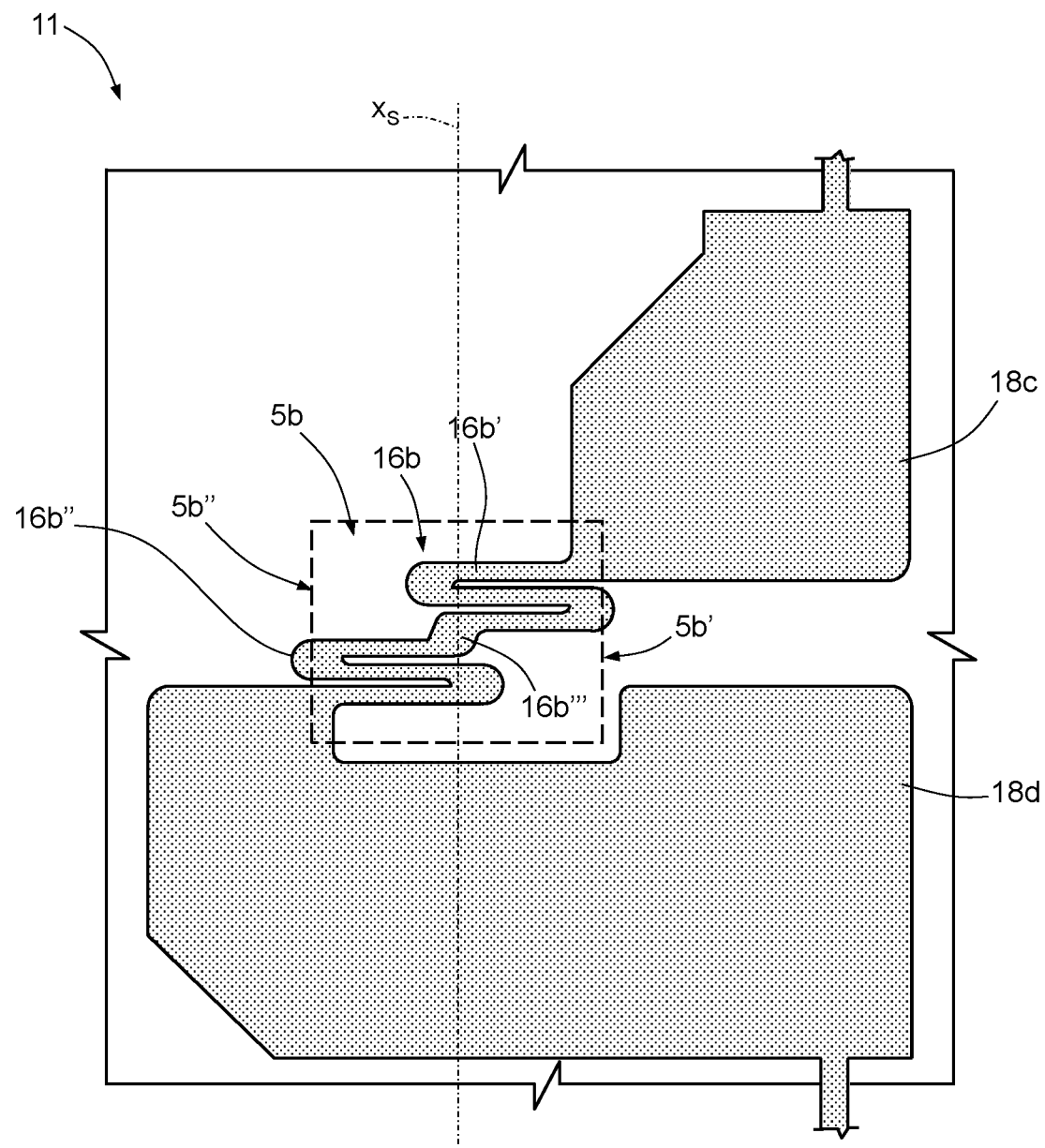

FIG. 6 shows an enlarged detail of the pressure sensor 11, from which the shape of the second piezoresistor 16b, housed by the second membrane 5b, can be appreciated. FIG. 6 also shows a third and a fourth electrical connection 18c, 18d that can be used to read the signal transduced by the second piezoresistor 16a. The electrical connections 18c, 18d are, for example, p+ implanted regions formed at the same time as the formation of the second piezoresistor 16b.

The second piezoresistor 16b is formed by a first portion 16b', a second portion 16b" and a third portion 16b'". The first portion 16b' and the second portion 16b" of the second piezoresistor 16b partially overlap a respective first edge 5b' and second edge 5b" of the second membrane 5b, these first and second edges 5b', 5b" being parallel to the X axis. In particular, the first and second portion 16b', 16b" of the second piezoresistor 16b therefore extend symmetrically with respect to an axis of symmetry $x_s$ which is parallel to the first and second edge 5b', 5b" of the second membrane 5b and passes through the geometric center of the second membrane 5b.

Additionally, the first and second portion 16b', 16b" of the second piezoresistor 16b are connected, respectively, to the third and fourth electrical connection 18c, 18d and have a zigzag shape when viewed from above, having a plurality (three in this case) of straight segments connected by curved portions. In particular, each straight segment has a main direction of extension orthogonal, respectively, to the first and second edge 5b', 5b" of the second membrane 5b; the third portion 16b'" of the second piezoresistor 16b has a substantially square shape when viewed from above, and extends in a central portion of the second membrane 5b, interconnecting the first and the second portion 16b', 16b" of the second piezoresistor 16b.

The zigzags forming the first and second portion 16b', 16b" of the second piezoresistor 16b each have a total length $L_s$ of between 40 µm and 80 µm for example, equal to 60 µm for example, and a width $W_s$ of between 1 µm and 3 µm, equal to 2 µm for example. The total length $L_s$ and the width $W_s$ of the first and second portion 16b', 16b" of the second piezoresistor 16b are selected so as to provide a suitable value of resistance for the desired value of sensitivity of the pressure sensor 11; for example, the resistance of each of the first and second portion 16b', 16b" of the second piezoresistor 16b is between 1 kilohm and 10 kilohm for a sensitivity value of between 5 mV/V/FS and 20 mV/V/FS. The zigzag shape enables the compactness of the second piezoresistor 16b to be increased, allowing the same resistance to be obtained in a smaller area compared with a square shape.

The third and fourth electrical connection 18c, 18d extend partially above the second membrane 5b to make the pressure sensor 11 more compact.

The contribution to the transduced signal generated by a piezoresistive effect by portions of the third and fourth electrical connections 18c, 18d which extend over the second membrane 5b is negligible, because of their low resistance relative to the resistance of the first and second portion 16b', 16b" of the second piezoresistor 16b.

The third portion 16b''' of the second piezoresistor 16b also makes a negligible contribution to the transduced signal, because of its low resistance and because of the fact that it extends in a central region of the second membrane 5b, in which the plane stress due to an external pressure acting on the pressure sensor 11 is minimized.

The main contribution to the transduced signal is therefore provided by the first and second portion 16b', 16b" of the second piezoresistor 16b. According to the embodiment of FIGS. 4 and 6, the second piezoresistor 16b is scarcely subject to any variations of sensitivity due to errors of alignment between the second piezoresistor 16b and the second membrane 5b, for similar reasons to those described with reference to FIG. 4.

The third piezoresistor 16c is formed on the third membrane 5c according to the teachings given in respect of the first piezoresistor 16a of FIG. 5, and the fourth piezoresistor 16d is formed on the fourth membrane 5d according to the teachings given in respect of the second piezoresistor 16b of FIG. 6. The piezoresistors of the pressure sensor 11 are connected in a Wheatstone bridge according to the teachings given in respect of the pressure sensor 1 of FIG. 3.

A method of manufacturing the pressure sensor 1 is described below with reference to FIGS. 7A-7F. FIGS. 7A-7F show a detail of the pressure sensor 1 corresponding to the first membrane 5a. The portions of the pressure sensor 1 corresponding to the remaining membranes 5b-5d are subject to the same steps of the manufacturing method.

Figure 7A:
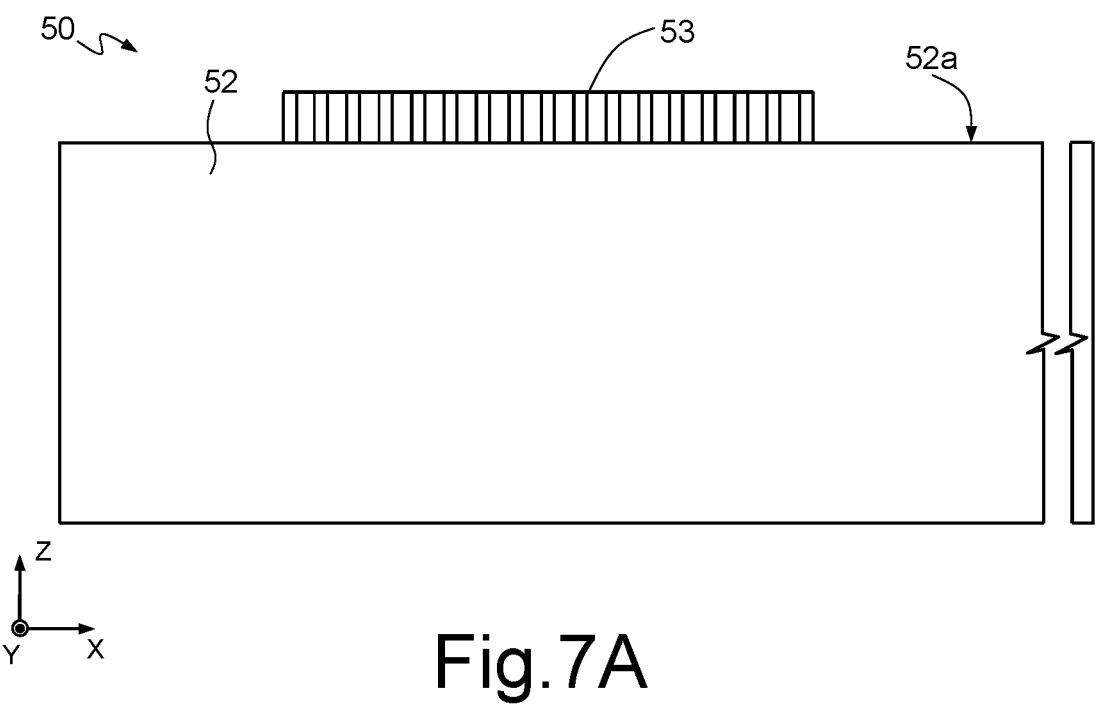
FIGS. 7A-7F show steps of a process of manufacturing the pressure sensor of FIGS. 1 and 2.

FIG. 7A is a sectional view of a semiconductor wafer 50, particularly an n-type monocrystalline silicon wafer, during an initial step of the manufacture of the pressure sensor 1. A single pressure sensor or a plurality of pressure sensors may be formed on the wafer 50, by the same manufacturing steps.

Figure 7B:
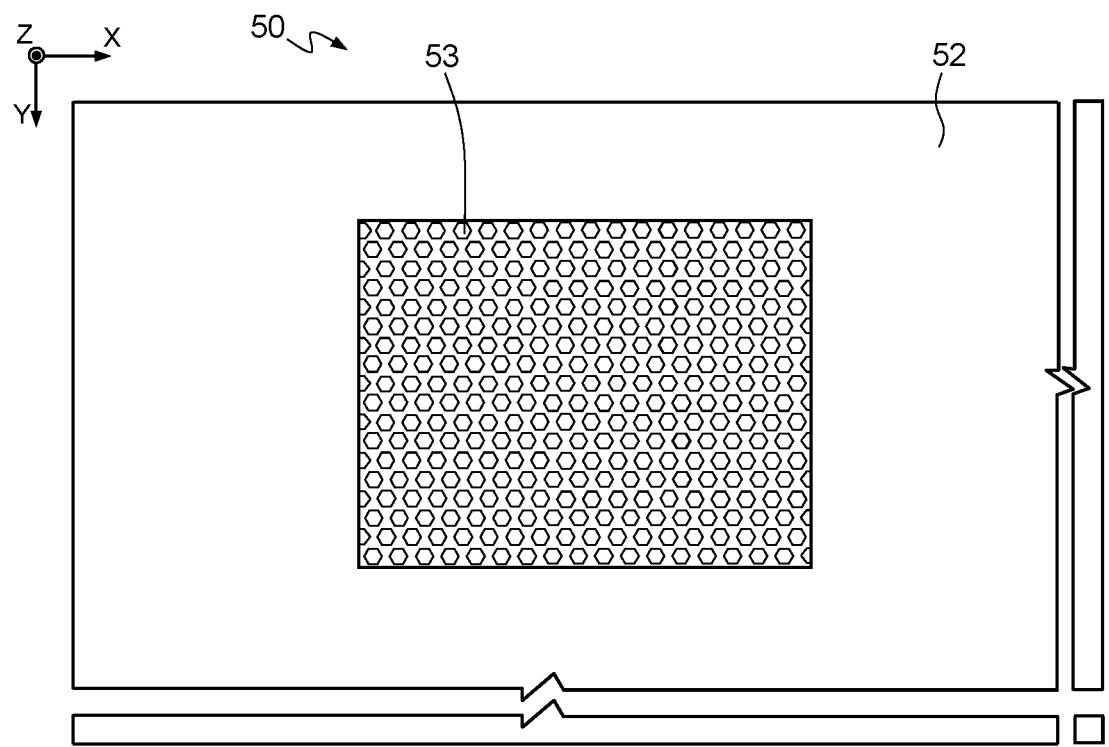
Figure 7C:
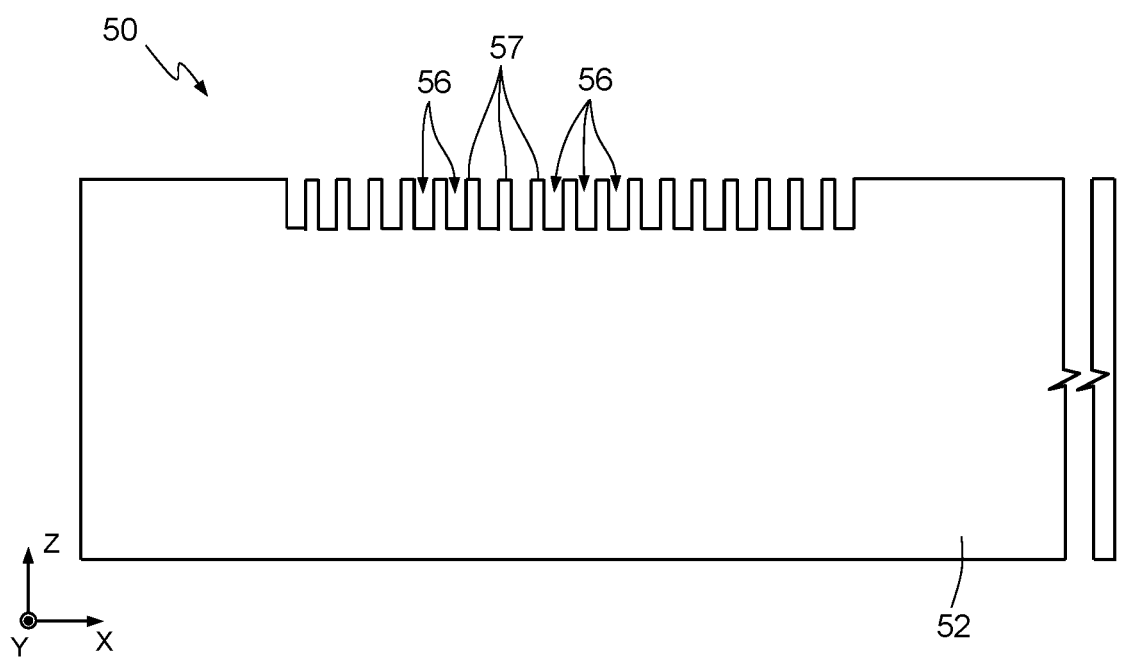
Figure 7D:
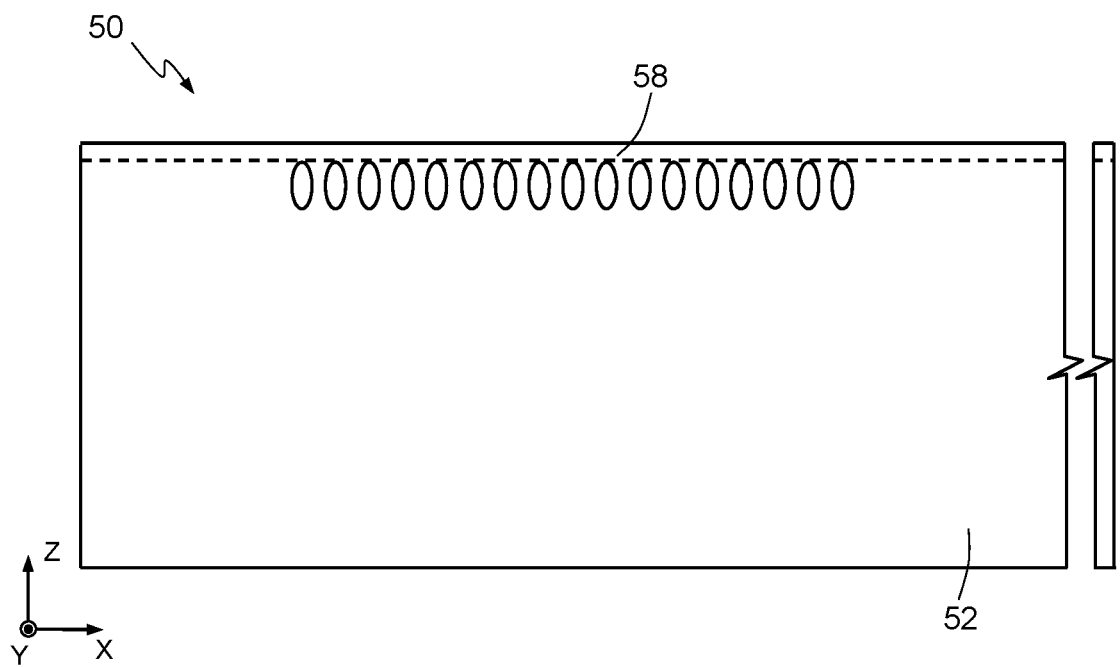
Figure 7E:
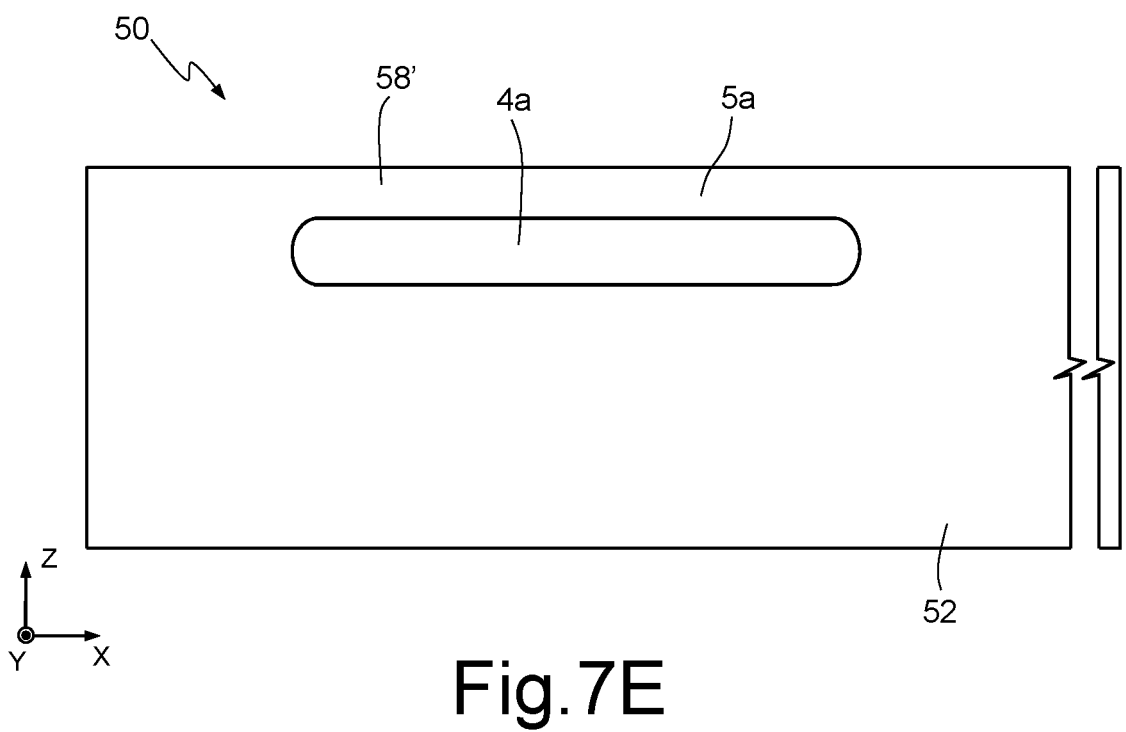
Figure 7F:
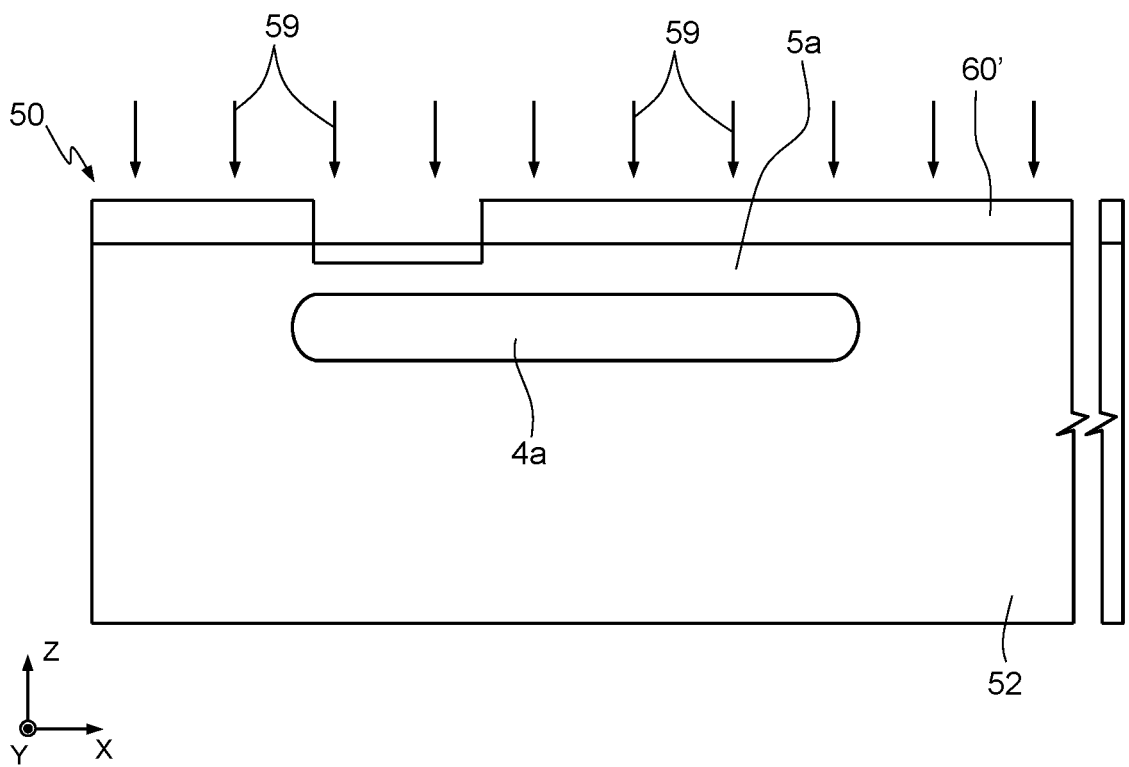

With reference to FIG. 7A (a cross-sectional view) and FIG. 7B (a top view), the wafer 50 comprises a semiconductor body 52 (e.g., a substrate, machined in advance if desired), made of n-type monocrystalline silicon in this case. A mask 53 of photoresist is formed on top of an upper surface 52a of the semiconductor body 52 by a step of photolithography. The mask 53 is formed on the regions of the semiconductor body 52 in which the cavities 4a-4d respectively are to be formed.

The mask 53 forms a honeycomb lattice having masking regions, of hexagonal shape for example, adjacent to one another.

Using the mask 53 (FIG. 7C), the semiconductor body 52 is etched to form trenches 56 having a depth of several micrometers, between 5 µm and 25 µm for example. The trenches 56 define silicon pillars 57 which are substantially identical to one another and have a shape corresponding to the honeycomb regions defined by the mask 53. By way of example, each pillar 57 has a diameter of about 1 µm and is separated from an adjacent pillar, along X or along Y, by about 1 µm. In general, the diameter and spacing of the pillars 57 are selected to have values such that the top of the trenches 56 can be closed during the step of epitaxial growth described below.

The mask 53 is then removed (FIG. 7D) and epitaxial growth is carried out in a deoxidizing environment (typically in an atmosphere having a high concentration of hydrogen, preferably using trichlorosilane ($SiHCl_3$)). The epitaxial growth is carried out at least until the tops of the trenches 56 are closed (for 45 seconds at a temperature near 1200° C., for example).

An epitaxial layer 58 (which in the following text is not distinguished from the semiconductor body 52, and is identified by the same reference numeral 52) consequently grows above the silicon pillars 57, closes the tops of the trenches 56, and traps the gas present (molecules of hydrogen $H_2$, in this case) in them.

A step of annealing is then carried out, for about 30-40 minutes at a temperature of about 1190-1200° C., for example. The annealing step causes (FIG. 7E) a migration of the silicon atoms, which tend to move to the lower-energy position, in a known way, for example as discussed in the paper by T. Sato, N. Aoki, I. Mizushima and Y. Tsunashima, "A New Substrate Engineering for the Formation of Empty Space in Silicon (ESS) Induced by Silicon Surface Migration", IEDM 1999, pp. 517-520.

In the trenches 56, where the silicon pillars are close together, the silicon atoms migrate completely and form the cavities 4a-4d, which are closed above by a suspended layer 58'.

The annealing is preferably carried out in an $H_2$ atmosphere, in order to prevent the hydrogen present in the trenches 56 from leaking outwards through the epitaxial layer, and to increase the hydrogen concentration present in the cavities 4a-4d if the amount trapped during the epitaxial growth step is not sufficient. Alternatively, the annealing may be carried out in a nitrogen environment.

This is followed (FIG. 7F) by a step of implanting (shown by arrows 59) p-type doping elements, such as boron, in regions not protected by a mask 60. A subsequent step of thermal diffusion results in the formation of the piezoresistors 6a-6d and the respective electrical connections. The mask 60 is then removed, to produce the pressure sensor 1 of FIGS. 1 and 2.

The pressure sensor 11 is manufactured by the same manufacturing method as that of FIGS. 7A-7F. In this case, the mask 60 is defined so as to form the piezoresistors 16a-16d having the shape described above.

Figure 8:
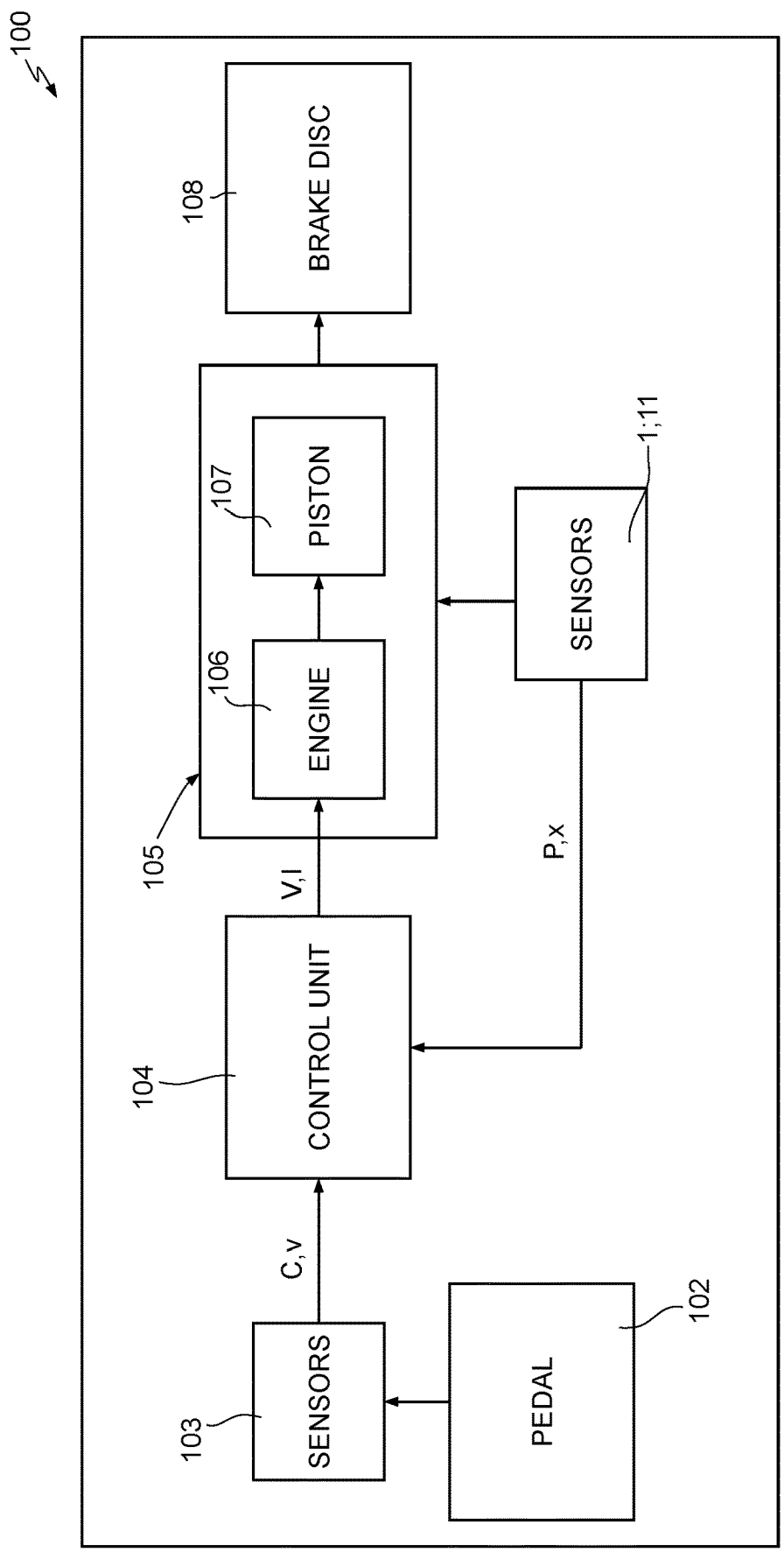
FIG. 8 shows a block diagram of a braking system that houses the microelectromechanical transducer of FIG. 1 or FIG. 4, according to a respective embodiment.

FIG. 8 shows an example of a block diagram of a braking system 100 of the electromechanical type, comprising one or more pressure sensors according to any of the embodiments described above.

In particular, the braking system 100 further comprises a brake pedal 102; first sensors 103 for detecting the travel C and the actuation speed v of the brake pedal 102; an electronic control unit 104, connected to the first sensors 103; an electromechanical actuator 105 connected to the electronic control unit 104, and comprising an electric motor 106 and a piston 107 connected to the electric motor 106, by a connecting element of the endless screw type for example (not shown); a brake disc 108, connected to the electromechanical actuator 105 and fixed to a wheel of a vehicle (in a known way which is not shown); and one or more pressure sensors 1 and/or 11 according to the present disclosure, capable of detecting information relating to the braking action exerted by the electromechanical actuator 105 on the brake disc 108, and connected by a feedback loop to the electronic control unit 104.

In use, the first sensors 103 send data relating to the travel C and the actuation speed v of the brake pedal 102 to the electronic control unit 104, which, on the basis of these data, generates a control signal (in voltage V, or in current I) for the electromechanical actuator 105 (particularly the electric motor 106). On the basis of this control signal, the electric motor 106 generates a drive torque which is converted into a linear movement of the piston 107 by the endless screw connecting element. The piston 107 therefore presses on the brake disc 108 (by means of pads of abrasive material, not shown) in order to brake its rotation. The pressure sensors 1, 11 detect the value of the pressure P exerted by the piston 107 on the brake disc 108 and the position x of the piston 107 relative to the brake disc 108, and send these data as feedback to the electronic control unit 104. Thus the electronic control unit 104 performs closed loop control (PID control, for example) of the braking action.

According to one aspect of the present disclosure, the pressure sensors 1, 11 are housed in an enclosure of the electromechanical actuator 105, so as to be sensitive to the pressure P exerted by the piston 107. Alternatively, the pressure sensors 1, 11 are housed in the hydraulic circuit of the braking system, to measure the pressure of the fluid directly.

Evidently, other applications are possible for the pressure sensors 1 and 11; for example, they may be used in the fuel injection circuit in diesel engines, for measuring the amount of diesel oil injected into the cylinders; in an industrial environment, for monitoring specific components and parts of pressurized circuits (robot arms, etc.); or in air conditioning systems; or in other applications in which it is useful to measure and/or monitor a pressure level of a fluid and/or a gas, particularly high pressures (e.g., 30 MPa or above).

An examination of the characteristics of the disclosure described and illustrated here will reveal the advantages which it offers.

In particular, in addition to the advantages illustrated above, it is possible to provide a pressure sensor with a highly rigid membrane and thus to increase the end-of-scale value without increasing the complexity of the manufacturing method used for pressure sensors with a low end-of-scale value of a known type.

Finally, the disclosure described and illustrated herein can evidently be modified and varied without departure from the protective scope of the present disclosure.

For example, the first and second portions of the piezoresistors of the pressure sensor 11 may have any shape which is different from the zigzag shape, for example a square shape.

The cavities 4a-4d may also have a different shape, for example circular or elliptical or hexagonal or more generally polygonal or polygonal with rounded vertices. The cavities 4a-4d may also be arranged in any other geometric configuration.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A microelectromechanical transducer comprising:
   a monolithic semiconductor body;
   a first cavity, a second cavity, a third cavity, and a fourth cavity buried within the semiconductor body;
   a first membrane, a second membrane, a third membrane, and a fourth membrane covering the first cavity, the second cavity, the third cavity, and the fourth cavity, respectively, and forming a portion of a surface of the semiconductor body, the first, second, third, and fourth membranes being configured to deflect in response to an external pressure acting on the surface of the semiconductor body; and
   a first transducer element, a second transducer element, a third transducer element, and a fourth transducer element at least partially in the first, second, third, and fourth membranes, respectively, and electrically coupled to one another in a Wheatstone bridge configuration to convert the external pressure into an electrical signal.

2. The microelectromechanical transducer according to claim 1, wherein the first, second, third, and fourth transducer elements are made of piezoresistive material, and wherein:
   the first and third transducer elements are arranged so as to be subject to deformations caused by deflections of the first and third membranes, respectively, and thereby cause a reduction in resistance; and
   the second and fourth transducer elements are arranged so as to be subject to deformations caused by deflections of the second and fourth membranes, respectively, and thereby cause an increase in resistance.

3. The microelectromechanical transducer according to claim 2, wherein the first, second, third, and fourth transducer elements have longitudinal lengths, and wherein the longitudinal lengths of the first and third transducer elements are transverse to the longitudinal lengths of the second and fourth transducer elements.

4. The microelectromechanical transducer according to claim 2, wherein each of the first, second, third, and fourth transducers comprise:
   a first portion facing towards a first edge of the respective membrane that the transducer is at least partially in,
   second portion facing towards a second edge of the respective membrane, the second portion being opposite the first edge, and
   a third portion that electrically couples the first and second portion,
   wherein each of the first portions and the second portions of the first and third transducers comprises a respective piezoresistive region parallel to the first edge and the second edge of the respective membrane,
   wherein each of the first portion and the second portion of the second and fourth transducers comprises a respective piezoresistive region orthogonal to the first edge and the second edge of the respective membrane,
   and wherein the first portion of each of the first, second, third and fourth transducers extends to a first distance from the first edge of the respective membrane that the transducer is at least partially in, and the second portion of each of the first, second, third and fourth transducers extends to a second distance from the second edge of the respective membrane that the transducer is at least partially in, the second distance being substantially equal to the first distance.

5. The microelectromechanical transducer according to claim 4, wherein, for each of the first, second, third, and fourth transducers, the first and second portions have a same value of electrical resistance, and the third portion has a value of electrical resistance that is lower by at least one order of magnitude than the value of electrical resistance of the first and second portions.

6. The microelectromechanical transducer according to claim 4, wherein each of the first and second portions of the first, second, third, and fourth transducers forms a zigzag shape in plan view, the piezoresistive regions of the first and second portions forming part of the respective zigzag shape.

7. The microelectromechanical transducer according to claim 1, wherein the first, second, third, and fourth membranes have a shape selected from the following: square, circular, or square with rounded edges.

8. The microelectromechanical transducer according to claim 1, wherein the first, second, third, and fourth membranes have a rigidity between 100 N/m and $2 \cdot 10^6$ N/m.

9. The microelectromechanical transducer according to claim 1, wherein the first, second, third, and fourth membranes have a sensitivity between 5 mV/V/F S and 20 mV/V/FS, where "FS" is an end-of-scale value of the microelectromechanical transducer and is between 5 MPa and 50 MPa.

10. The microelectromechanical transducer according to claim 1, wherein the first, second, third, and fourth membranes are square shaped and have an area between $2.5 \cdot 10^3$ $\mu m^2$ and $22.5 \cdot 10^3$ $\mu m^2$, and a thickness between 4 µm and 10 µm.

11. A system comprising:
a microelectromechanical transducer including:
a monolithic body of semiconductor material;
first, second, third, and fourth cavities buried within the monolithic body;
first, second, third, and fourth membranes covering the first cavity, the second cavity, the third cavity, and the fourth cavity, respectively, and forming a portion of a surface of the monolithic body, the first, second, third, and fourth membranes being configured to deflect in response to an external pressure acting on the surface of the monolithic body; and
first, second, third, and fourth transducer elements at least partially in the first, second, third, and fourth membranes, respectively, and electrically coupled to one another in a Wheatstone bridge configuration to convert the external pressure into an electrical signal.

12. The system according to claim 11, wherein the system is a braking system for vehicles, a fuel injection assembly, a robotic system, or an air conditioning system.

13. The system according to claim 11, further comprising a control unit coupled to the microelectromechanical transducer, wherein the first, second, third, and fourth membranes of the microelectromechanical transducer have a shape selected from the following: square, circular, or square with rounded edges.

14. A method comprising:
forming first, second, third, and fourth membranes in portions of an upper surface of a monolithic semiconductor body, wherein the first, second, third, and fourth membranes are suspended over first, second, third, and fourth cavities, respectively, of the monolithic semiconductor body, wherein the first, second, third, and fourth membranes are configured to deflect in response to pressure;
forming first, second, third, and fourth transducer elements in the first, second, third, and fourth membrane, respectively; and
electrically coupling the first, second, third, and fourth transducer elements to one another in a Wheatstone bridge configuration.

15. The method according to claim 14, wherein the first, second, third, and fourth transducer elements are made of piezoresistive material,
wherein forming the first and third transducers comprises forming the first and third transducers to be configured to be subject to deformations caused by deflections of the first and third membranes, respectively that cause reductions in the values of resistance; and
wherein forming the second and fourth transducers comprises forming the second and fourth transducers to be configured to be subject to deformations caused by the deflection of the second and fourth membranes, respectively, which cause an increase in the respective value of resistance.

16. The method according to claim 15, wherein the first and third transducers have longitudinal lengths that are parallel with each other, wherein the second and fourth transducers have longitudinal lengths that are parallel with each other, wherein the longitudinal lengths of the second and fourth transducers are transverse to the longitudinal lengths of the first and third transducers.

17. The method according to claim 15, wherein, forming the first, second, third, and fourth transducer elements comprises:
forming first portions facing first edges of the respective membrane;
forming second portions facing away from the first edges; and
forming third portions that electrically couple the first and second portions of the respective transducer element.

18. The method according to claim 17, wherein forming the first, second, third, and fourth transducers comprises modelling the first and second portions in such a way that the first and second portions have a same value of electrical resistance, and modelling the third portion in such a way that the third portion has a value of electrical resistance that is lower by at least one order of magnitude than the value of electrical resistance of the first and second portions.

19. The method according to claim 17, wherein forming each of the first and second portions of the first, second, third, and fourth transducers comprises forming a zigzag, the piezoresistive region of the first and second portions being formed as an integral part of the respective zigzag.

20. The microelectromechanical transducer according to claim 14, wherein the first, second, third, and fourth membranes are formed so as to have respective square shapes, each with an area of between $2.5 \cdot 10^3$ $\mu m^2$ and $22.5 \cdot 10^3$ $\mu m^2$, and a thickness of between 4 µm and 10 µm.

* * * * *